JOSIAH MUMFORD, OF CLARKSBURG, OHIO.

Letters Patent No. 83,299, dated October 20, 1868.

PROCESS OF PRESERVING POTATOES.

The Schedule referred to in these Letters Patent and making part of the same.

*To all whom it may concern:*

Be it known that I, JOSIAH MUMFORD, of Clarksburg, in the county of Ross, and State of Ohio, have discovered a new and useful Process for Preserving Sweet and other Potatoes; and I do hereby declare the following to be a full, clear, and exact description of the same.

Many attempts have been made to preserve potatoes through the winter-months or season, particularly sweet potatoes, and a process has been patented for the use of calcined sand in that connection.

The object has not heretofore been fully attained, so far as I know, by any one. It may have been approached, but not fully realized. My process, I believe, will accomplish the purpose in a greater degree than any other heretofore known, and is more nearly perfect than any of the known processes.

My invention consists in the use of a packing-compound, composed of lime and loam or sand, which is used for covering and filling in the interstices after the potatoes have been sprinkled or dusted with lime.

To enable others skilled in the art to make and use my invention, I will proceed to describe the same with reference to the process, as follows:

The potatoes should be thoroughly dried, and then sprinkled, dusted, or mixed with dry lime, (slaked lime will answer a good purpose,) until they are covered with as much as will adhere to them. I then prepare a compound of lime and loam or sand, of, say, one part of lime to twenty parts of loam or sand, which should be well mixed. The potatoes, with the lime adhering to them, are then placed in barrels, boxes, or bins, and carefully covered with the composition, the spaces between and around the potatoes being all filled in.

In this condition, the potatoes will keep, without loss of flavor or of bulk, for an entire year, if so desired, but from season to season without rot, shrinkage, or damage of any kind.

Having thus fully described my invention,

What I claim therein as new, and desire to secure by Letters Patent, is—

The above-described process of preserving potatoes, viz, by dusting or sprinkling them with lime, and then packing them away in a composition of lime and loam or sand, as herein described and represented.

JOSIAH MUMFORD.

Witnesses:
  J. F. BURRIS,
  JAS. M. REEVES.